United States Patent [19]

Weaver et al.

[11] 4,396,547
[45] Aug. 2, 1983

[54] ACID AZO DYES CONTAINING HETEROCYCLIC COUPLERS

[75] Inventors: Max A. Weaver; Clarence A. Coates, Jr., both of Kingsport, Tenn.

[73] Assignee: Eastman Kodak Company, Rochester, N.Y.

[21] Appl. No.: 182,905

[22] Filed: Sep. 2, 1980

[51] Int. Cl.$^3$ .................. C09B 29/36; D06P 3/24; D06P 3/52
[52] U.S. Cl. .................. 260/158; 260/152; 260/153; 260/154; 260/155; 260/156; 260/157; 260/165
[58] Field of Search ........................ 260/158

[56] References Cited

U.S. PATENT DOCUMENTS

| | | | |
|---|---|---|---|
| 3,255,173 | 6/1966 | Dehnert et al. | 260/158 X |
| 3,468,873 | 9/1969 | Meininger et al. | 260/158 |
| 3,829,411 | 8/1974 | Coates et al. | 260/158 |
| 4,247,458 | 6/1981 | Shuttleworth | 260/158 |
| 4,255,326 | 3/1981 | Giles et al. | 260/158 X |
| 4,302,387 | 11/1981 | Giles et al. | 260/158 X |

FOREIGN PATENT DOCUMENTS 2005292 4/1979 United Kingdom ............... 260/165

OTHER PUBLICATIONS

Trotman, *Dyeing and Chemical Technology of Textile Fibres*, 3rd Ed., Griffin, London, 1964, p. 507.
Dillmann, "Melliand Textilberichte", 43-3/1962, p. 265.
von der Eltz, "Melliand Textilberichte", 46-3/1965, pp. 286-289.
Venkataraman, Ed., *The Chemistry of Synthetic Dyes*, vol. III, New York: Academic Press, 1970, pp. 27-28.
Venkataraman, Ed., *The Chemistry of Synthetic Dyes*, vol. VI, New York: Academic Press, 1972, pp. 27-29.

*Primary Examiner*—Thomas A. Waltz
*Attorney, Agent, or Firm*—Donald W. Spurrell; Daniel B. Reece, III

[57] ABSTRACT

Disclosed are novel acid azo dyes containing a sulfonated, sulfated or thiosulfated organothiothiadiazole azo moiety and a heterocyclic coupler which may be substituted. The dyes produce reddish-yellow to orange shades on, for example, hydrophobic textile fiber including polyesters, polyamides, and cellulose esters and have excellent fastness properties including lightfastness, stability to heat, washfastness and resistance to sublimation, and dye at unusually low energy levels. The dyes have the general formulae:

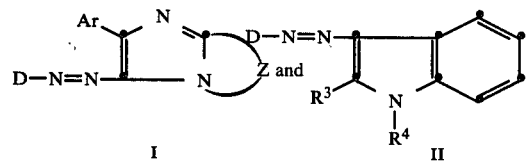

wherein D is the aforesaid organothiothiadiazole moiety; $R^3$ is selected from hydrogen, lower alkyl, and aryl; $R_4$ is selected from H, lower alkyl, $CH_2$ aryl, aryl, and lower alkyl substituted with cyano, carbamoyl or acylamino; Ar is a wide variety of carbocyclic radicals; and Z represents the atoms necessary to complete a five or six membered ring.

2 Claims, No Drawings

ACID AZO DYES CONTAINING HETEROCYCLIC COUPLERS

This invention concerns novel acid azo dyes containing a sulfonated, sulfated or thiosulfated organothiothiadiazole azo moiety and a heterocyclic coupler which may be substituted. The dyes produce redish-yellow to orange shades on, for example, polyamides and cellulose esters and have excellent fastness properties including lightfastness, stability to heat, crock, washfastness and resistance to sublimation, dye at unusually low energy levels and give good build and depth of shade. The dyes have the general formulae:

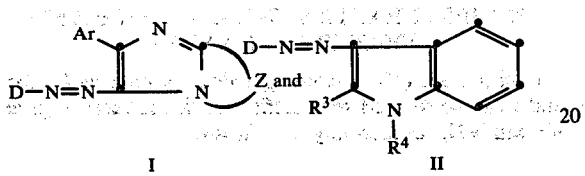

I  II wherein D is the aforesaid organothiadiazole moiety; $R^3$ is selected from hydrogen, lower alkyl, and aryl; $R_4$ is selected from H, lower alkyl, $CH_2$ aryl, aryl, and lower alkyl substituted with cyano, carbamoyl or acylamino; Ar is a wide variety of carbocyclic radicals; and Z represents the atoms necessary to complete a five or six membered ring.

The diazo moiety D has the formula

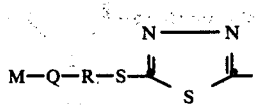

wherein R is selected from straight or branched lower alkylene, lower alkylene containing in its chain one or more of $-O-$, $-S-$, $-C_6H_4-$, $-C_6H_{10}-$, $-NH-CO-$, $-SO_2NH-$,

$-OC_6H_4-$, $-SC_6H_4-$ or $-N(SO_2$ lower alkyl$)-$, divalent cyclic aliphatic and arylene, each of which R groups may be substituted with 1–3 of $-SO_3M$, $-OSO_3M$, $-SSO_3M$, $-OH$ or lower alkoxy, Q is $SO_3$, $SO_4$ or $SSO_3$, and M is an alkali metal or ammonium.

The carbocyclic groups represented by Ar can be unsubstituted or substituted with lower alkyl, lower alkoxy, halogen, hydroxy, lower alkylamino, nitro, cyano and the like. Specific examples of such carbocyclic groups include but are not limited to phenyl, p-tolyl, m-ethylphenyl, p-anisyl, p-chlorophenyl, o-bromo-p-tolyl, o,p-dichlorophenyl and p-cyanophenyl.

The carbon atoms of the groups represented by Z can be substituted or unsubstituted. Typical examples of the ring atoms of Z are

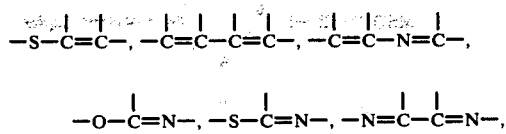

The carbon atoms of such groups can be substituted with various substituents including a fused carboxylic ring which may also be substituted. Examples of such substituents are hydrogen, oxygen, lower alkyl, lower alkoxy, halogen, lower alkylsulfonyl, thiocyanato, alkylthio, etc. As used herein to describe a substituent containing an alkyl, alkylene, alkoxy, or the like moiety, the word "lower" designates a carbon content of one to six carbon atoms. Typical of the Z groups are

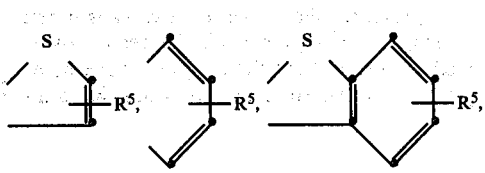

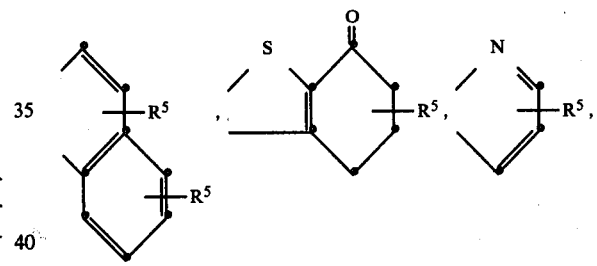

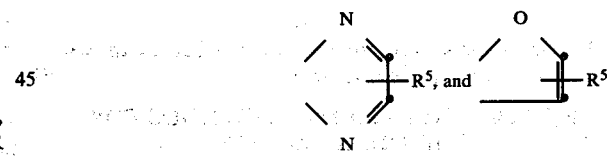

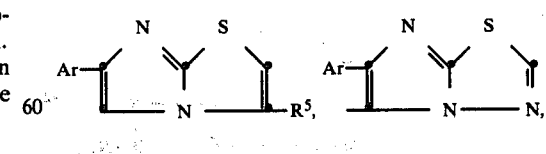

wherein $R^5$ represents a group selected from hydrogen, lower alkyl, lower alkoxy, halogen, and preferably, not more than two substituents.

A preferred group of the coupler components of the novel compounds of the invention have the formulae

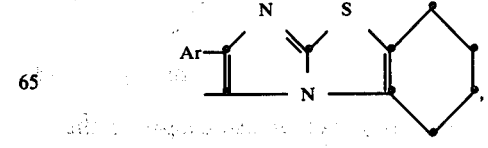

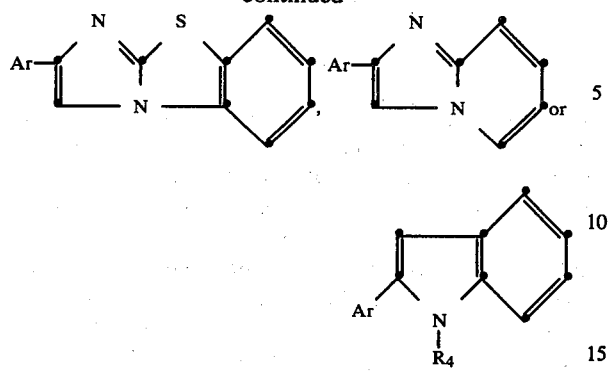

wherein Ar represents phenyl or phenyl substituted with lower alkyl, and $R^5$ represents hydrogen or lower alkyl. Especially preferred are the coupler components conforming to the above structure to which $R^5$ is attached.

The azo moieties are prepared by procedures known to the art as exemplified below.

GENERAL PREPARATIVE METHODS FOR THE DIAZO MOIETY

The intermediate 2-amino-1,3,4-thiadiazoles III may be prepared by reacting 2-amino-5-mercapto-1,3,4-thiadiazole (I) with appropriate halides II as follows:

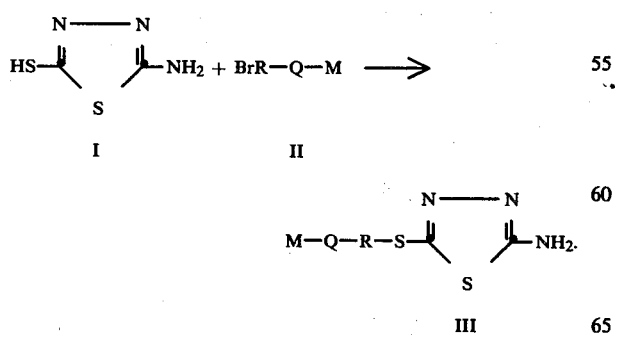

Compounds III are then diazotized and coupled in the normal manner to give dyes IV

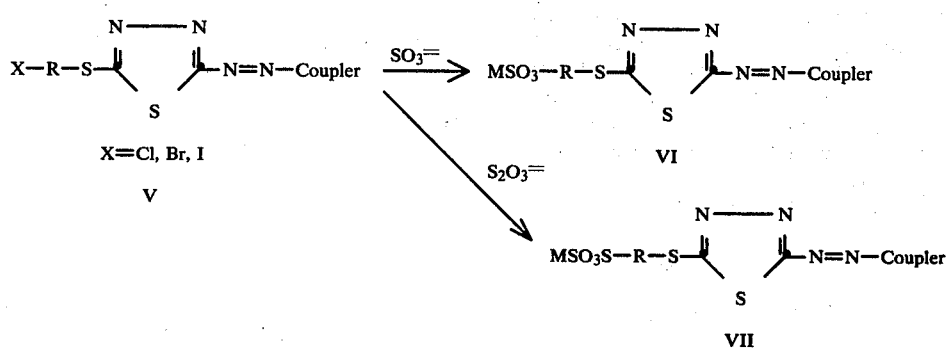

SPECIFIC REACTION WITH SULFITE AND THIOSULFATE SALTS

Compounds (V) containing halogens such as Cl, Br and I can be reacted with sulfites or thiosulfates to give VI and VII, respectively as follows:

SPECIFIC REACTION OF HYDROXYL CONTAINING DYE WITH SULFURIC ACID

Sulfate esters (IX) may be prepared by reacting dyes VIII containing one or more hydroxyl groups with sulfuric acid as follows:

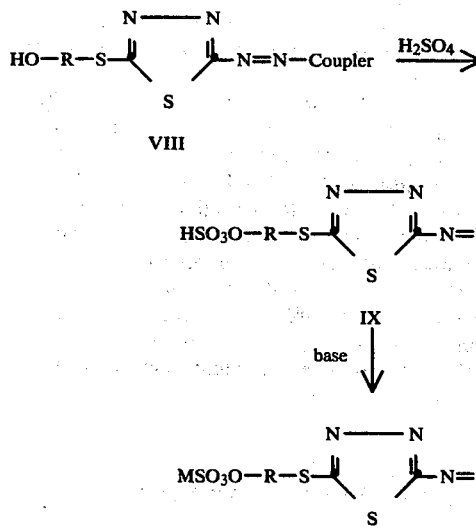

Salts X of the sulfate esters are prepared by neutralizing IX with base, such as alkali metal hydroxides, metal carbonates or ammonium hydroxide as shown above.

DIRECT SULFONATION

When R contains an aromatic ring, with or without a linking group $R_1$, the sulfonic acid derivatives may be prepared by direct sulfonation, either to produce dyes XI directly or intermediate XII may be sulfonated, followed by diazotization and coupling, to give dyes XI as follows:

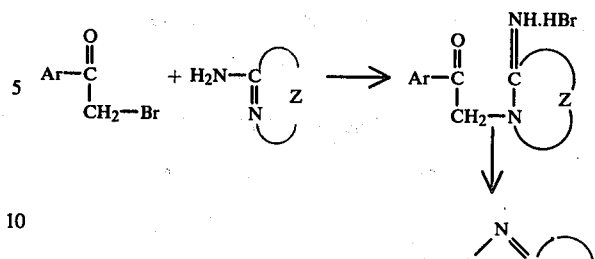

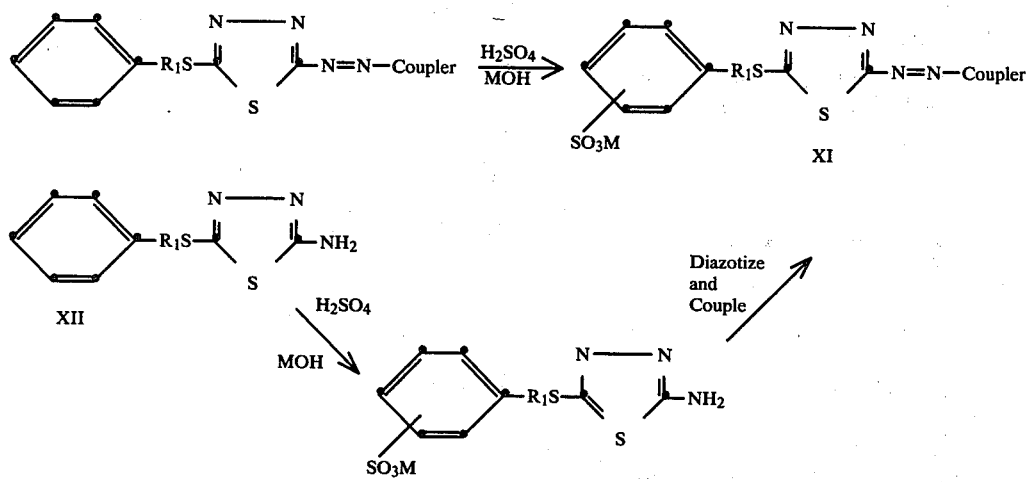

This invention will be further illustrated by the following examples although it will be understood that these examples are included merely for purposes of illustration and are not intended to limit the scope of the invention.

EXAMPLE 1

Preparation of 2-Amino-5-[(2-Sulfoethyl)thio]-1,3,4-thiadiazole Na Salt

2-Amino-5-mercapto-1,3,4-thiadiazole (13.3 8, 0.10 m), 2-bromoethanesulfonic acid, Na salt (21.1 g, 0.10 m), sodium carbonate (0.11 m), sodium iodide (1 g), and water (100 ml) are heated on a steambath until reaction is complete as determined by thin-layer chromatography, usually within 6 hours. The reaction mixture is cooled and drowned into about 500 ml of acetone. The white precipitate is collected by filtration and dried in air. The product

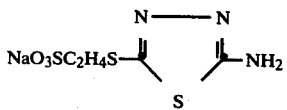

contains some salt but is used without further purification to prepare azo dyes.

The couplers of Formula I above are prepared by methods, or methods analogous to those described in the literature, such as A. Chem. 2, 153 (1962); C.A., 58, 453g; Ber., 95, 1128 (1962); Ger., 60, 1607 (1927); and J. Pharm. Soc. Japan, 57, 1050 (1937); C.A. 32, 33,985, and as disclosed in U.S. Ser. No. 661,215. A reaction by which the couplers may be prepared is as follows:

COUPLER PREPARATION

EXAMPLE 2

6,6-Dimethyl-8-Keto-2-Phenyl-5,6,7,8-Tetrahydroimidazo[2,1-b]Benzothiazole

A 0.08 m. quantity each of 2-amino-5,5-dimethyl-7-keto-4,5,6,7-tetrahydrobenzothiazole and α-bromoacetophenone are mixed in 150 ml. of chloroform and heated at reflux for 4 hours. The slurry is filtered hot and the insoluble intermediate product is suspended in 600 ml. of water containing 25 g. of sodium acetate. This suspension is heated slowly to boil over 2½ hours, then allowed to cool. The product is filtered off, washed well with water and dried yielding 12.5 g. of product melting at 175°–178° C. and having the structure:

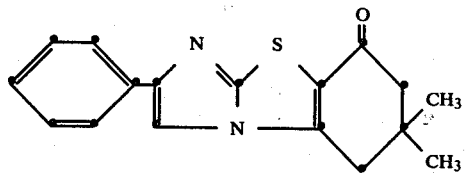

EXAMPLE 3

2-Phenylimidazo[1,2-a]Pyrimidine

An equimolar mixture of 2-aminopyrimidine and α-bromoacetophenone are heated in absolute ethanol for several hours at 60°–70° C. Anhydrous ether is added to precipitate the hydrobromide of the product. The free base, melting at 202° C., is obtained by the action of aqueous Na₂CO₃ solution and has the formula

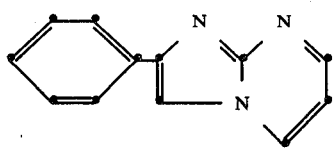

EXAMPLE 4

7-Methyl-2-Phenylimidazo[1,2-c]Pyrimidine

Substitution of 4-amino-6-methylpyrimidine in Example 2 yields a coupler which melts at 244° C. and has the structure:

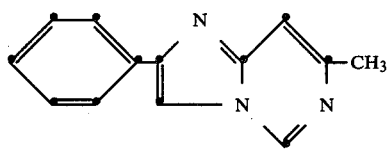

EXAMPLE 5

2-Phenylimidazo[2,1-b]Benzothiazole

A 0.2 m. quantity of each of 2-aminobenzothiazole and α-bromoacetophenone are mixed in 350 ml. of chloroform and heated at reflux for 1½ hours. After cooling, the solid intermediate product is filtered off and slurried in 2 l. of water containing 10 ml. of 48% hydrobromic acid. This is then heated to a boil, filtered hot, and after allowing to cool the filtrate is basified with NH₄OH to yield 6.8 g. of 2-phenylimidazo[2,1-b]benzothiazole melting at 108°-10° C. and having the formula:

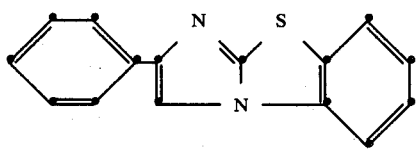

EXAMPLE 6

2-Phenylimidazo[1,2-a]Pyridine 0.1 m. Quantities of 2-aminopyridine and α-bromoacetophenone are heated in 150 ml. of chloroform at reflux for 2 hours. The chloroform is evaporated and the oily residue taken up in 10% HCl, warmed, charcoal added and filtered. The filtrate is neutralized with NH₄OH and the solid product isolated and recrystallized from ethanol. The yield of product is 12.7 g., melts at 135°-137° C. and has the structure:

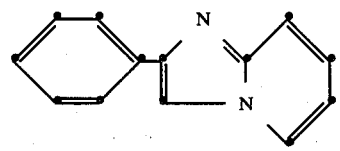

EXAMPLE 7

2-Phenyl-5,6,7,8-Tetrahydroimidazo[2,1-b]Benzothiazole 0.1 m. Quantities of 2-amino-4,5,6,7-tetrahydrobenzothiazole and α-bromoacetophenone in 100 ml. of chloroform are heated at reflux for 2 hours. After cooling, the solid is filtered off and slurried in 1 l. of water containing 40 g. of ammonium acetate. This suspension is heated to boiling over a 2-hour period and allowed to cool. The product is collected, washed with water and dried. The yield of product is 19.8 g. melting at 158°-160° C. and having the formula:

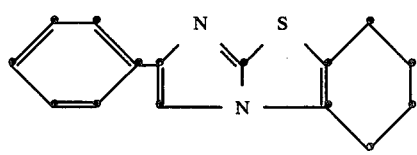

EXAMPLE 8

6-Phenylimidazo[2,1-b]-1,3,4-Thiadiazole 10.1 g. of 2-amino-1,3,4-thiadiazole are dissolved in 160 ml. of ethanol, 19.9 g. of α-bromoacetophenone is added and the solution is heated and stirred at reflux for 1 hour. After cooling, the solid is filtered off and dissolved in 750 ml. of water and 40 ml. of 48% hydrobromic acid. This solution is heated at reflux for 1 hour, neutralized by addition of solid ammonium acetate and refluxed ½ hour longer. After cooling, the product is collected on a filter, washed with water and dried. The yield of product is 13 g. melting at 127°-130° C. It has the formula:

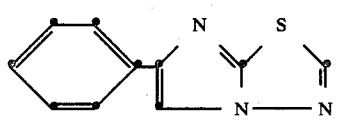

EXAMPLE 9

6-Phenylimidazo[2,1-b]thiazole

Bromine (21.5 ml.) is added to a solution of 50 g. of acetophenone and 0.1 g. of anhydrous AlCl₃ in 200 ml. of chlorobenzene. The addition requires about 20 minutes and the temperature of the reaction solution rises to about 35° C. Dry air is bubbled through the solution until all the gaseous HBr is removed. 2-Aminothiazole (24 g.) is added and the reaction mixture stirred and heated on a steam bath for 1 hour. The thick reaction mixture is filtered while still hot and the filter cake washed with hexane. The dry product is slurried in 200 ml. of methanol and then diluted with a solution of 80 g. ammonium acetate in 1600 ml. of water. This suspension is stirred and heated to 80° C., then filtered and the product thus obtained is washed with 4 l. of water. The yield is 70 g. of product which melts at 143°-144° C. and has the structure:

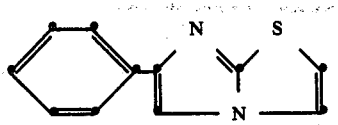

Additional couplers can be prepared by employing techniques either published in the literature or analogous to those described in the preceding examples.

The dyes of this invention can be applied to synthetic polyamide, polyester and cellulose acetate fibers according to known disperse dyeing techniques. The dyeings on Nylon may be carried out as follows:

A sample containing 66.70 mg of pure dye is dissolved in hot demineralized water. If the acid dye cake will not dissolve in hot water use 5 ml of 2-methoxyethanol (methyl Cellosolve) or other satisfactory solvent. Sufficient demineralized water is added to make 30:1 dyebath and added are 1% owf leveling agent, biphenyl derivative), and 1% owf ammonium hydroxide. The pH is adjusted to 6.0 with acetic acid. A ten-gram sample of nylon carpet wet out in demineralized water is entered into the dyebath which is placed in a pressure type Launder-Ometer container. The pressure container is entered into a Launder-Ometer at room temperature. The temperature is brought up to 208° F. at 5°/minute and the dyeing is carried out at 208° F. for one hour. The pressure container is removed from the Launder-Ometer and cooled. The dyed carpet is removed from the pressure container, rinsed in hot filtered water and then cold demineralized water, and dried at 250° F.

A more detailed discussion of the generally applicable procedures for dyeing polyamides with acid dyes is found in the translated text, Preparation and Dyeing of Synthetic Fibres, H. U. Schmidlin, Reinhold Publishing Corporation, N.Y., 1963.

The following table shows exemplary dyes of the present invention.

TABLE 1

| M | Q | R | Ar | Z |
|---|---|---|---|---|
| Na | SO$_3$ | —C$_2$H$_4$— | | —S—CH—CH— |
| Na | SO$_3$ | C$_2$H$_4$ | C$_6$H$_5$ | " |
| Na | SO$_3$ | —C$_2$H$_4$— | " | " |
| K | SO$_4$ | —C$_2$H$_4$— | " | " |
| K | SO$_4$ | —C$_2$H$_4$— | " | 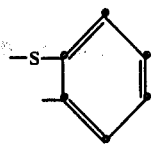 |
| Na | SSO$_3$ | —C$_2$H$_4$— | " |  |
| Na | SSO$_3$ | —C$_2$H$_4$— | " | " |
| Na | SSO$_3$ | —C$_2$H$_4$— | " | " |
| Na | SSO$_3$ | —C$_2$H$_4$— | " | 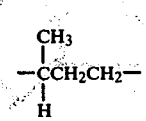 |
| K | SO$_3$ | —CCH$_2$CH$_2$— (CH$_3$, H) | " | —S—CH=N— |

TABLE 1-continued $$M-Q-R-S-\underset{\underset{S}{\|}}{C}-\underset{N}{\overset{N--N}{\diagup\diagdown}}-N=N-\underset{\overset{Ar}{\mid}}{C}=\underset{\overset{\|}{N}}{C}\diagdown Z$$

| M | Q | R | Ar | Z |
|---|---|---|----|---|
| Na | SO₄ | —CH₂CH₂CH₂— | | cyclohexylidene-S-C= (thioether with cyclohexane ring) |
| Na | SO₃ | —CH₂CHCH₂—<br>       OH | " | acetyl-S-C= with cyclohexane ring |
| Na | SO₃ | —CH₂CHCH₂—<br>       OH | | —S—CH=CH— |
| Na | SO₃ | —CH₂CHCH₂—<br>       OH | " | " |
| K | SO₃ | —CH₂CH₂OCH₂CH₂— | 4-Br—C₆H₄ | " |
| K | SO₃ | —CH₂CH₂OCH₂CH₂— | 4,5-di(OH)C₆H₃ | " |
| Na | SO₃ | —CH₂CH₂O—C₆H₄— | 4-dimethylamino-C₆H₄ | " |
| Na | SO₃ | —CH₂CH₂O—C₆H₄— | C₆H₅ | " |
| Na | SO₃ | —CH₂CH₂O—C₆H₄— | " | —S—C(Cl)=C(Cl)— |
| Na | SSO₃ | —CH₂CH₂SCH₂CH₂— | " | S (thiophene-type) |
| K | SO₄ | —CH₂—(C₄H₂S)—CH₂— (thiophene-diyl) | " | " |
| K | SO₃ | —C₆H₄— | 4-Br—C₆H₄ | S, CH₃ substituted ring |

TABLE 1-continued

M—Q—R—S—C(=N—N=)—... structure with Ar, N=N, Z ring

| M | Q | R | Ar | Z |
|---|---|---|---|---|
| K | SO$_3$ | -C$_6$H$_4$-CH$_2$- | C$_6$H$_5$ | -S-CH=CH- |
| K | SO$_3$ | -C$_6$H$_4$-CH$_2$- | 4-NO$_2$-C$_6$H$_4$ | " |
| K | SO$_3$ | -C$_6$H$_4$-CH$_2$- | C$_6$H$_5$ | " |
| K | SO$_3$ | -CH$_2$CH$_2$NHCOCH$_2$- | " | -S-CH=CH- |
| Na | SSO$_3$ | -CH$_2$CH$_2$SO$_2$NHCH$_2$CH$_2$- | 4-OCH$_3$-C$_6$H$_4$ | " |
| K | SO$_3$ | -CH$_2$CH(SO$_3$K)CH$_2$- | C$_6$H$_5$ | -O-CH=CH- |
| K | SO$_4$ | -CH$_2$CH(OC$_2$H$_5$)CH$_2$- | " | -O-CH=C(CH$_3$)- |
| Na | SO$_3$ | -CH$_2$CH$_2$NHSO$_2$CH$_2$CH$_2$- | " | -N=CH-CH=CH- (pyridine-like) |
| Na | SO$_3$ | -CH$_2$CH$_2$OC(=O)CH$_2$- | " | pyrazine-like ring with N |
| K | SO$_3$ | -CH$_2$CH(OH)CH$_2$O-C$_6$H$_4$- | " | -S-(C=O)-cyclohexanone ring |

TABLE 1-continued $$M-Q-R-S-C(=S)-\text{[thiadiazole-N=N-C(Ar)=N-N(Z)]}$$

| M | Q | R | Ar | Z |
|---|---|---|----|---|
| K | SO$_3$ | —CH$_2$—C$_6$H$_4$—CH$_2$— | " | (styryl-type ring) |
| K | SO$_3$ | —CH$_2$CH$_2$S—C$_6$H$_4$— | " | oxazole (O, N ring) |
| Na | SO$_3$ | —CH$_2$CH$_2$NHC(O)CH$_2$O—C$_6$H$_4$— | " | pyrazine (N, N ring) |
| Na | SO$_3$ | —CH$_2$CH$_2$—N(SO$_2$CH$_3$)—CH$_2$CH$_2$— | " | —S—CH=CH— |
| Na | SO$_4$ | —CH$_2$CH(OSO$_3$Na)CH$_2$— | " | " |
| Na | SSO$_3$ | —CH$_2$CH(SSO$_3$Na)CH$_2$— | " | " |
| Na | SSO$_3$ | —C$_2$H$_4$— | " | " |
| Na | SO$_3$ | —C$_2$H$_4$— | " | " |
| K | SO$_4$ | —C$_2$H$_4$— | " | " |

TABLE 2

$$M-Q-R-S-C(=S)-\text{[thiadiazole]}-N=N-C(R^3)=\text{[indole-NR^4]}$$

| M | Q | R | R$^3$ | R$^4$ |
|---|---|---|-------|-------|
| Na | SO$_3$ | C$_2$H$_4$ | H | H |
| Na | SO$_3$ | " | CH$_3$ | CH$_3$ |
| K | SO$_4$ | " | C$_6$H$_5$ | H |
| " | " | " | CH$_3$ | CH$_2$C$_6$H$_5$ |
| Na | SSO$_3$ | " | C$_6$H$_5$ | C$_2$H$_5$ |
| Na | SSO$_3$ | —CH$_2$CH$_2$SCH$_2$CH$_2$— | H | H |
| K | SO$_4$ | —CH$_2$—(thiophene-S)—CH$_2$— | CH$_3$ | CH$_3$ |
| K | SO$_3$ | —CH$_2$—C$_6$H$_4$ (phenylene)— | C$_6$H$_5$ | H |

TABLE 2-continued $$M-Q-R-S-C\begin{smallmatrix}N-N\\\phantom{xx}\\S\end{smallmatrix}-N=N-\overset{R^3}{\underset{R^4}{\text{(indole)}}}$$

| M | Q | R | R³ | R⁴ |
|---|---|---|---|---|
| K | SO₃ | —(C₆H₄)—CH₂— | CH₃ | CH₂C₆H₅ |
| K | SO₃ | —CH₂CH₂NHCOCH₂— | C₆H₅ | C₂H₅ |
| Na | SSO₃ | —CH₂CH₂SO₂NHCH₂CH₂— | H | H |
| K | SO₃ | —CH₂CH(SO₃K)CH₂— | CH₃ | CH₃ |
| K | SO₄ | —CH₂CH(CH₂OC₂H₅)CH₂— | C₆H₅ | H |
| K | SO₃ | —C(CH₃)(H)CH₂CH₂— | C₆H₅ | H |
| Na | SO₄ | —CH₂CH₂CH₂— | CH₃ | CH₂C₆H₅ |
| Na | SO₃ | —CH₂CH(OH)CH₂— | C₆H₅ | C₂H₅ |
| K | SSO₃ | —CH₂CH₂OCH₂CH₂— | H | H |
| Na | SO₃ | —CH₂CH₂O—(C₆H₄)— | CH₃ | CH₃ |
| Na | SO₃ | —CH₂CH₂NHSO₂CH₂CH₂— | C₆H₅ | H |
| Na | SO₃ | —CH₂CH₂OC(O)CH₂— | CH₃ | CH₃ |
| K | SSO₃ | —CH₂CH(OH)CH₂O—(C₆H₄)— | C₆H₅ | CH₃ |
| K | SO₃ | —CH₂—(C₆H₄)—CH₂— | C₆H₅ | H |
| K | SO₃ | —CH₂CH₂S—(C₆H₄)— | H | H |
| Na | SO₃ | —CH₂CH₂NHC(O)CH₂O—(C₆H₄)— | CH₃ | CH₃ |
| Na | SO₃ | —CH₂CH₂—N(SO₂CH₃)—CH₂CH₂— | C₆H₅ | H |
| Na | SO₄ | —CH₂CH(OSO₃Na)CH₂— | CH₃ | CH₂C₆H₅ |
| Na | SSO₃ | —CH₂CH(SSO₃Na)CH₂— | C₆H₅ | C₂H₅ |

TABLE 2-continued

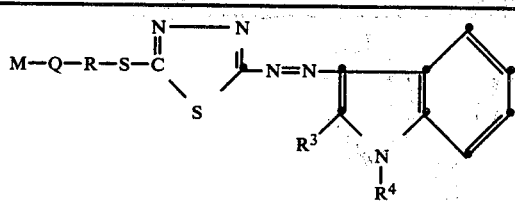

| M | Q | R | R³ | R⁴ |
|---|---|---|---|---|
| Na | SO₃ | —CH₂CH₂— | C₆H₅ | CH₂CH₂CN |
| Na | SO₃ | —CH₂CH₂— | C₆H₅ | CH₂CH₂CONH₂ |
| Na | SO₃ | —CH₂CH₂— | C₆H₅ | CH₂CH₂CH₂NHCOCH₃ |
| Na | SO₃ | —CH₂CH₂— | C₆H₅ | CH₂CH₂CH₂NHCO— |
| Na | SO₃ | —CH₂CH₂— | C₆H₅ | CH₂CH₂CH₂NHSO₂CH₃ |
| Na | SO₃ | —CH₂CH₂ | C₆H₅ | CH₂CH₂CH₂NHCOOC₂H₅ |

The invention has been described in detail with particular reference to preferred embodiments thereof, but it will be understood that variations and modifications can be effected within the spirit and scope of the invention.

We claim:

1. A compound of the formula:

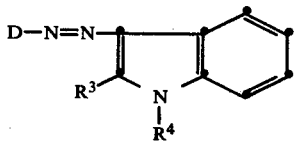

wherein R³ is selected from hydrogen, lower alkyl and aryl; R⁴ is selected from H, lower alkyl, CH₂-aryl, aryl, and lower alkyl substituted with cyano, carbamoyl or acylamino; and D has the formula

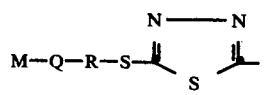

wherein R is selected from straight or branched lower alkylene, lower alkylene containing in its chain one or more of —O—, —S—, —C₆H₄—, —C₆H₁₀—, —NHCO—, —SO₂NH—, $$-O\overset{O}{\underset{\|}{C}}-,$$

—OC₆H₄—, —SC₆H₄— or —N(SO₂ lower alkyl)—, divalent cyclic aliphatic and arylene, each of which R groups may be substituted with 1–3 of —SO₃M, —OSO₃M, —SSO₃M, —OH or lower alkoxy, Q is SO₃, and M is an alkali metal or ammonium.

2. The compound according to claim 1 of the formula

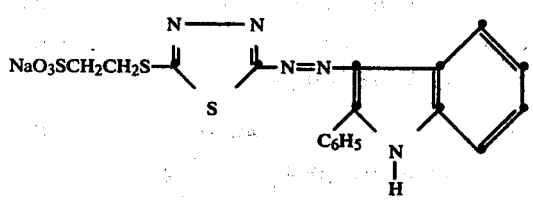

* * * * *